Patented Nov. 26, 1929

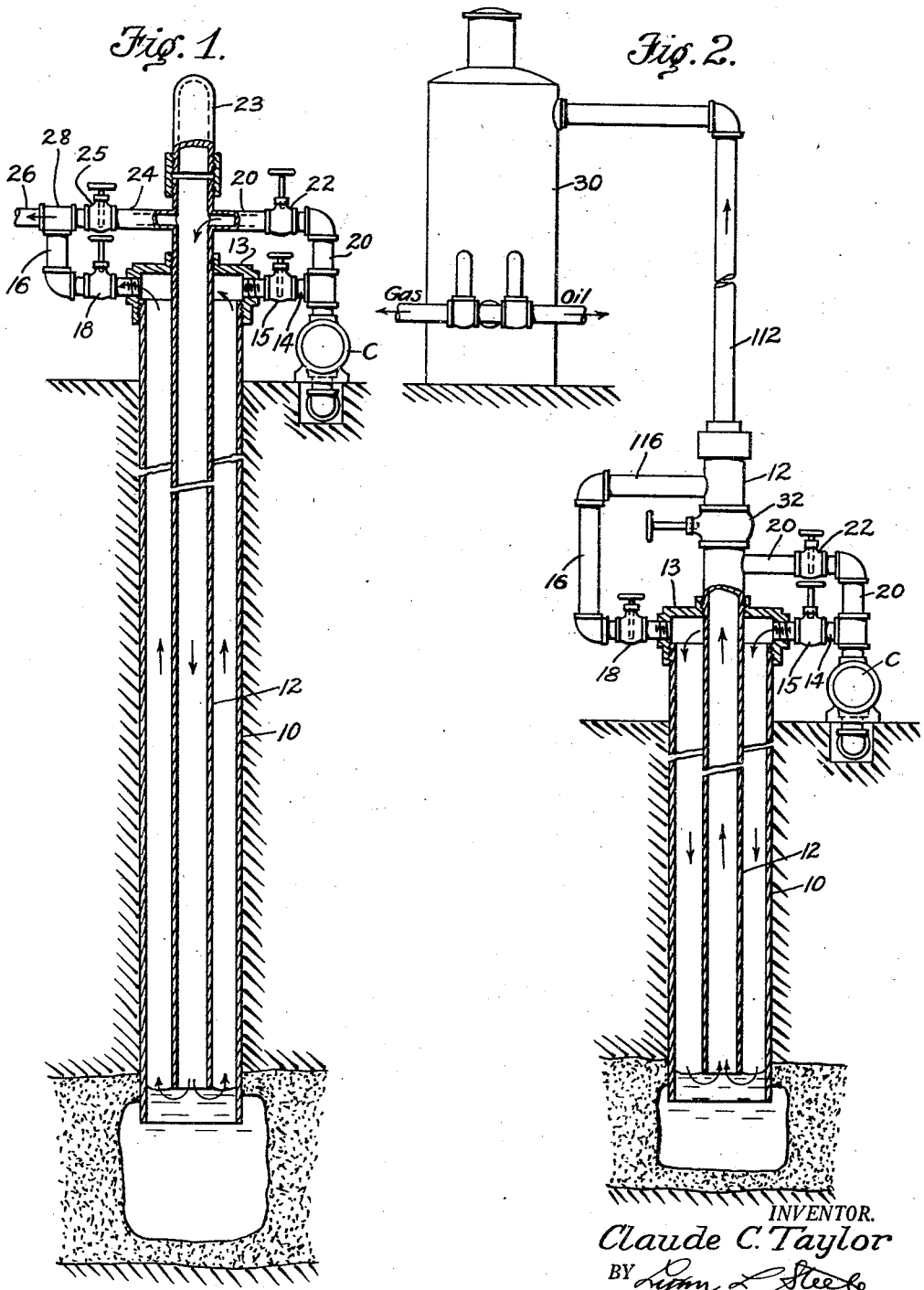

1,737,541

UNITED STATES PATENT OFFICE

CLAUDE C. TAYLOR, OF FULLERTON, CALIFORNIA, ASSIGNOR TO UNION OIL COMPANY OF CALIFORNIA, OF LOS ANGELES, CALIFORNIA, A CORPORATION OF CALIFORNIA

GAS-LIFT CONNECTION FOR OIL WELLS

Application filed July 18, 1927. Serial No. 206,687.

This invention relates to connections adapted to be applied to casing heads when flowing oil wells by gas lift and the object thereof is to provide a simple structure whereby the oil may be flowed out from either the casing or the flow tube under pressure of gas applied through the flow tube or the casing, respectively.

Briefly stated, the invention resides in a pair of connections which may be termed "bypasses", each of which is provided with valves and is connected with both the casinghead and the flow tube. One of these connections receives gas from a compressor, or other pressure source such as a high pressure well, and conducts it either to the casinghead or to the flow tube according to the positions of the valves, and the other connection leads off from either the casing or the flow tube according to the position of the valves and connects with a flow-off line. In one form, the flow-off line may extend horizontally from the connection, and in another form it may extend vertically and in alignment with the flow tube.

In the accompanying drawings, wherein certain modifications are disclosed by way of illustration;

Fig. 1 shows a double by-pass connection wherein the flow-off line extends horizontally, and Fig. 2 shows a modification wherein the flow-off line extends vertically and in alignment with the flow tube.

Both figures show an ordinary well casing 10 into which a flow tube 12 depends through the casinghead 13. From one side of said casinghead a connection 14 provided with a valve 15 leads to a compressor "C" or other source of gas under pressure, and from the other side of the casinghead there extends a connection 16 provided with a valve 18. The compressor "C" also connects with a short conduit 20 controlled by a valve 22 by means of which the gas may be conducted directly to the flow tube 12. In the form of Fig. 1 the upper end of flow tube 12 is provided with a bull plug 23 and in this form a connection 24 leads horizontally from the flow tube 12 and is provided with a control valve 25. Both of the connections 16 and 24 lead to a horizontally disposed flow-off line 26, connection being made by way of a T 28.

With the form just described, gas may be supplied by the connections 14 and 20 to casing 10 or to flow tube 12, according to the adjustment of the valves 15 and 22, and oil may be carried to the flow-off line 26 through either of the connections 16 and 24, according to the adjustment of the valves 18 and 25. With the various valves in the positions indicated, gas under pressure is being introduced to the flow tube and passed around the lower end thereof in order to spray or atomize the oil which rises up thereto in the hole, and the atomized oil is carried out from the top of the casing through connection 16 to the flow-off line 26. By reversing the valve positions, the gas may be passed through the connection 14 into the casing and the atomized oil carried up through the flow tube and out through connection 24 to the flow-off line 26. In the form shown in Fig. 2, a flow-off line 112 is disposed in vertical alignment with the flow tube 12 and leads to a gas trap or gas and oil separator, 30. In this form, the connections 14 and 20 with their valves, are arranged as in that of Fig. 1, but the connection 16 has a return portion 116 whch leads back to the flow tube 12 at a point above the control valve 32 therein which performs the same function as the valve 25 of Fig. 1. Thus, gas under pressure may be applied either to the casing or to the flow tube through connection 14 and 20 according to adjustment of valves 15 and 22, and the atomized oil may be led to the flow-off line 112 either by way of the connection 16, 116, or directly upward through the flow tube 12, according to the adjustment of valves 18 and 32. As shown, the valve 15 is open and valve 22 is closed so that the gas is passed into the casing, around the lower end of the flow tube to atomize the oil and upward through the flow tube to the line 112, the valve 18 being closed and valve 32 being opened. However, if desired, the positions of the valves may be reversed so that gas may be passed by way of connection 20 through the flow tube 12 and the atomized oil carried from the casing by way of the connections 16 to the upper end of the flow tube above the closed valve 32, and thence to the flow-off line and trap.

From the foregoing, it will be obvious that by means of either the forms disclosed, a gas lift well may be flowed either from the tubing or from the casing by proper manipulation of the various valves. There are many conditions which make it desirable to vary the flow in the manner above indicated, including leaky casings and difficulties in starting wells to flowing, and it is in overcoming these obstacles that this construction is particularly useful.

The above disclosures are to be considered not as limiting but as merely illustrative, and many variations of the invention may be made within the scope of the following claims.

I claim:

1. A casinghead assembly for a gas lift well within which a flow tube depends, comprising a pair of by-pass connections, each of which is connected with both the casing and the flow tube, valves in each connection, means for supplying gas under pressure to one connection and a flow-off line connected to receive from the other connection.

2. A casinghead assembly for a gas lift well within which a flow tube depends, comprising a pair of connections, each connection being connected with both the casing and the flow tube, control valves for said connections, means for supplying gas under pressure to one connection, and a flow-off line connected to receive from the flow tube and the other connection.

3. In a gas lift well having a casing into which a vertically disposed flow tube depends, a flow-off line vertically aligned with said flow tube, a valve between said tube and said line, a by-pass for said casing to said line having a valve therein, a connection leading both to said tube and said casing and having valves therein, and means for applying gas under pressure to said connection and thence to either the tube or the casing.

Signed at Los Angeles, in the county of Los Angeles and State of California, this 11th day of July, A. D. 1927.

CLAUDE C. TAYLOR.